United States Patent
Kageyama (10) Patent No.: US 6,760,770 B1
(45) Date of Patent: Jul. 6, 2004

(54) PORTABLE INFORMATION SYSTEM FOR RECEIVING INFORMATION VIA A COMMUNICATION NETWORK

(76) Inventor: Naoyuki Kageyama, 16-8, Kamezumi-cho, Kanagawa-ku, Yokohama-shi, Kanagawa-ken (JP)

( * ) Notice: Subject to any disclaimer, the term of this patent is extended or adjusted under 35 U.S.C. 154(b) by 616 days.

(21) Appl. No.: 09/643,592

(22) Filed: Aug. 22, 2000

(30) Foreign Application Priority Data

Aug. 26, 1999 (JP) .......................................... 11-240619
May 19, 2000 (JP) ................................... P2000-149072

(51) Int. Cl.[7] .............................................. G06F 15/16
(52) U.S. Cl. ...................... 709/229; 709/225; 709/226; 709/217
(58) Field of Search ............................... 709/217, 225, 709/226, 229

(56) References Cited

U.S. PATENT DOCUMENTS

| | | | | |
|---|---|---|---|---|
| 5,555,376 A | * | 9/1996 | Theimer et al. | 709/229 |
| 6,101,483 A | * | 8/2000 | Petrovich et al. | 705/26 |
| 6,199,753 B1 | * | 3/2001 | Tracy et al. | 235/375 |
| 6,202,023 B1 | * | 3/2001 | Hancock et al. | 701/201 |
| 6,205,126 B1 | * | 3/2001 | Moon | 370/329 |
| 6,236,365 B1 | * | 5/2001 | LeBlanc et al. | 342/457 |
| 6,295,502 B1 | * | 9/2001 | Hancock et al. | 701/201 |
| 6,522,875 B1 | * | 2/2003 | Dowling et al. | 455/414.3 |

FOREIGN PATENT DOCUMENTS

| | | |
|---|---|---|
| JP | Hei 09-257501 | 10/1997 |
| JP | 09-264750 | 10/1997 |
| JP | Hei 10-103977 | 4/1998 |
| JP | 11-055726 | 2/1999 |
| JP | 11-051666 | 3/1999 |
| JP | Hei 11-153447 | 6/1999 |

OTHER PUBLICATIONS

K. Nagao, "Agent Augmented Reality: Integration of the Real World and Information Worlds via Software Agents," *Journal of Information Processing Society of Japan*, vol. 38, No. 4, pp. 257–266 (Apr. 15, 1997).

* cited by examiner

*Primary Examiner*—Saleh Najjar
(74) *Attorney, Agent, or Firm*—Kolisch Hartwell, P.C.

(57) ABSTRACT

The present invention provides a portable information system the enables a user to access necessary information from a home page of a store even when the user does not know the URL of the home page. In order to attain this, a portable information terminal 1 has a wireless telephone communication function, such as a PHS, and a guide switch 1c that requests area information from the Internet provider 5, transmits via an antenna 1A to base station 3A or base station 3B, and obtains information about the current position by GPS. In addition, the base station 3A and base station 3B are connected to the ISDN public telecommunication network 2, for example, via an exchange, and connect the communication line between the public telecommunication network 2 and the portable information terminal 1. In addition, a server 5c having a database 5d that stores data is connected to the telecommunication network 2 via the access points 4A–4D of the Internet provider 5 and the provider communication network 5a. In the above structure, the portable information terminal 1 accesses the server 5c uses current position information and guide control signals, searches for information about stores in the area that indicated by the current position information, and transmits this information to the portable information terminal 1.

17 Claims, 7 Drawing Sheets

| REGISTRATION NUMBER | FACILITY TYPE | FACILITY NAME | FACILITY PHONE NO. | FACILITY ADDRESS | MAP COORDINATES | URL |
|---|---|---|---|---|---|---|
| 001 | STATION | TAKADANOBABA STATION | 03-X-Y | TOKYO-CITY, SHINJUKU-WARD, TAKADANOBABA, X-Y-X | SR-QG | WWW.Q.CO.JP |
| 002 | COFFEE HOUSE | ANGEL | 03-H-F | TOKYO-CITY, SETAGAYAKA-WARD, SHIMOKITAZAWA, A-K-M | PL-TG | WWW.K.CO.JP |
| 003 | BANK | YOTSUBISHI BANK, TAKADANOBABA BRANCH | 03-H-T | TOKYO-CITY, SHINJUKU-WARD, TAKADANOBABA, X-P-V | XZ-MN | WWW.P.CO.JP |
| 004 | DRUG STORE | TAKITSUKIDO | 03-P-A | TOKYO-CITY, NERIMA-WARD, HEIWADAI, S-K-K | QZ-DN | WWW.B.CO.JP |
| 005 | BOXED LUNCHES | HOKEHOKE | 03-E-C | TOKYO-CITY, ITABASHI-WARD, AKABANE, F-O-W | TT-GG | WWW.X.CO.JP |
| 006 | PLEASURE | EAST KANAGAWA BOWLING CENTER | 045-S-F | KANAGAWA, YOKOHAMA, TSURUMI-WARD, H-K-M | CC-DD | WWW.N.CO.JP |
| 008 | CONVENIENCE STORE | LAWSANS | 045-T-F | KANAGAWA, YOKOHAMA, TSURUMI-WARD, E-Z-F | VV-JJ | WWW.M.CO.JP |
| 010 | ATM | FUJIYAMA BANK, KANAGAWA BRANCH | 045-Y-L | KANAGAWA, YOKOHAMA, TSURUMI-WARD, G-W-Q | ZZ-QQ | WWW.Z.CO.JP |
| 011 | RESTAURANT | TEIKOKU RESTAURANT | 045-U-D | TOKYO-CITY, MINATO-WARD, AKASAKAMITSUKE, F-O-W | SS-LA | WWW.F.CO.JP |
| 012 | HOTEL | BUSINESS HOTEL TOGO | 03-D-C | TOKYO-CITY, SHIBUYA-WARD, HARAJUKU, S-P-K | WW-HH | WWW.T.CO.JP |
| 013 | CAFETERIA | TONKU | 045-451-XXX | KANAGAWA, YOKOHAMA, KANAGAWA-WARD, EAST | PP-HH | WWW.A.CO.JP |

FIG. 6

| REGISTRATION NUMBER | NAME | SEX | AGE/BIRTHDAY | NATIONALITY | PHONE NO. | ADDRESS | MARRIED/SINGLE | COMMENT | URL |
|---|---|---|---|---|---|---|---|---|---|
| P001 | OHATA HIROYUKI | MLE | 59 1940/7/6 | JAPAN | XX-XX-XXXX | TOKYO-TO, F CITY, HOSHINOKOCH | M | HOBBY: CAMERA | WWW.C.CO.JP/ |
| P002 | KIMURA KIKUO | MALE | 44 1956/2/8 | JAPAN | XX-XX-XXXX | TOCHIGI-KEN, U CITY, HIKARINUMACHO | M | HOBBY: FIGHTERS | WWW.D.CO.JP/ |
| P003 | SATO YUTA | MALE | 39 1961/3/5 | JAPAN | XX-XX-XXXX | TOKYO-TO, H CITY, NEJINOYAMACHO | M | HOBBY: GARDENING | WWW.E.CO.JP/ |
| P004 | KANEMAKI TERUYUKI | MALE | 26 1974/9/1 | JAPAN | XX-XX-XXXX | TOKYO-TO, J CITY, MIDORIOKACHO | S | HOBBY: MUSIC | WWW.G.CO.JP/ |
| P005 | YAMAGATA ARITOMO | MALE | 23 1977/4/1 | JAPAN | XX-XX-XXXX | AOMORI-KEN, M CITY, TSUKINOHIKARICHO | S | LOOKING FOR PARTNER | WWW.I.CO.JP/ |
| P006 | TUAI SHUFUN | FEMALE | 22 1978/3/3 | TAIWAN | XX-XX-XXXX | TOKYO-TO, N-KU, UMINOKUMOCHO | S | LOOKING FOR PARTNER | WWW.Y.CO.JP/ |

FIG. 7

PORTABLE INFORMATION SYSTEM FOR RECEIVING INFORMATION VIA A COMMUNICATION NETWORK

BACKGROUND OF THE INVENTION

1. Field of the Invention

The present invention relates to a portable information system wherein a portable information terminal that has a wireless communication capacity is connected to a communication network (referred to simply as the "Internet" hereinbelow), such as the Internet, via a provider, and obtains information about stores, train stations, etc., in an area that corresponds to information about the current position from an information providing device (for example, a WWW server) connected to the Internet.

This application is based on Patent Application Nos. 11-240619 and 2000-149072 filed in Japan, the content of which is incorporated herein by reference.

2. Description of the Related Art

When a personal information processing device, such as a personal computer (abbreviated "PC" hereinbelow), is connected to the Internet, normally, after contracting with a commercial provider that provides a telephone line connection service to the Internet, an arbitrary one among a plurality of access points (telephone numbers for connecting to a circuit) provided by the provider is selected, and by making a telephone connection, a communication line to the Internet is established.

Similarly, in recent years, portable information terminals, such as the personal handyphone systems (PHS), having a wireless communication function, have become commercially available in diverse models. Unlike the PC, use of these portable information terminals is not limited to one place, and thus what is termed mobile computing has become possible. This means that the portable information terminal has a modem with a wireless function for connecting to the Internet, and thus, even outdoors, the Internet can be accessed via one of the provider's access points, like a PC.

At the same time, in the portable information system using the current position acquisition system represented by the conventional car navigation system, based on information about the current position, the user can inquire about information on the Internet through a provider, and can obtain necessary information about facilities that include at least stores and public facilities. That is, there is necessary information (for example, information about a particular store), and the user acts as an agent to obtain this information from the Internet using a pull-type method. That is, in this portable information system, using the GPS (Global Positioning System), after the user knows an arbitrary point (the current position), the information about that area is obtained from the Internet.

Using the above-described portable information system, when the user wants to obtain information, for example, the current position from the GPS, and then tries to get information about a store in the vicinity from a home page on the Internet based on this position information, he connects to the store's home page using a URL (Uniform Resource Locater).

However, the conventional portable information terminals described above have the disadvantage that if the user does not know the URL of the home page of the store (the URL is not registered in the portable information device), it is not possible to connect to the necessary home page.

In addition, the conventional portable information terminals described above have the disadvantage that if the user does not know the URL of the home page of the store (the URL is not registered in the portable information device), this URL must be searched for on the Internet, and such a search may be vary laborious, so the necessary information cannot immediately be obtained from the home page.

Furthermore, in a search method based on the above-described position information, if a user does not know beforehand what type of stores there are in the area through which the user is traveling, a search for information about a store providing merchandise that the user wishes to purchase cannot be carried out on the Internet, and timely information acquisition cannot be carried out.

In addition, the conventional portable information system has the problem that only simple fixed information (the type of facility, the name of the facility, the address of the facility, the telephone number of the facility, the operating hours of the facility, a map showing the facility) can be registered in the device that is accessed and provides information.

That is, this fixed information is simply an extension of area information, such as the type of facility at a given location, and is not frequently updated.

Thus, the conventional portable information system has the disadvantage that after the user has once obtained information about a facility by accessing a device that provides information, there is no need to know identical information about a facility by repeated access, and there is no value in repeated access.

Therefore, the conventional portable information system is simply an electronic map system that renders maps electronically convenient, focusing on arriving at the location one is going to for the first time without getting lost.

SUMMARY OF THE INVENTION

In consideration of the above-described background, it is an object of the present invention to provide a portable information system that allows a user to obtain from a home page on the Internet necessary information about stores that is updated periodically without the user having to know the URL of the home page or having to know in advance what kind of stores are located in the vicinity.

The present invention is a portable information system that is connected to a communication network from a portable information terminal and obtains specified information from an information providing device connected to this communication network, characterized in providing a position information acquiring means by which the portable information terminal acquires information about its own position, and a communication means that establishes a communication line between the portable information terminal and the communication network via an access point, and carries out transmission and reception of the position information and the specified information, and wherein a communication network connection part is provided that searches for the information about the corresponding area from the information providing device based on the position represented by the position information received from the portable information device, and transmits the information about the corresponding area that was found to this portable information terminal.

In addition, the present invention provides a portable information system in which a user connects to a line at a server located at a provider with a portable information terminal and obtains information from the home page of a facility that has an advertising contract with the provider, and wherein each facility bears the cost of the communication charges for the portable information terminal connected to the server, and in exchange for bearing the communication charges, the provider supplies statistical information and personal information about the users who access the home page to the facility operating the home page.

By being structured in the above-described manner, the portable information system according to the present invention uses current position information obtained, for example, from the GPS, and the provider's server transmits information about stores and types of facilities (stations, city offices, health offices, tax offices, etc.), for example, that are provided in advance on the Internet via a telephone line or wireless connection to a user who is passing through the area of the stores and facilities, etc., that are present in the vicinity of the current location.

That is, in the portable information system according to the present invention, the user's position coming physically within a specified distance to the position of the information originator (the store or facility) serves as a trigger that prompts the transmission of information to the portable information terminal of the user. For example, in the portable information system according to the present invention, by using the GPS, when the distance between two arbitrary points (the position of the user and the position of the information originator) is within a specified range, transmission and reception of information is established.

Therefore, the portable information system according to the present invention is a method of using push-type Internet information access that transmits information on the Internet from a provider prompted by the user passing in vicinity of the store. Here, push-type means that by inputting a trigger signal (for example, guidance control information and current position information from the user), the Internet provider searches for information on the Internet on an information providing device, and transmits it to the portable information terminal of the user, even when there has been no request for the information from the user.

In addition, the portable information system of the present invention can provide an environment for notifying a user via a portable information terminal about information that facilities wish to provide in real time by using the home pages that are produced by the stores and facilities, etc., that are registered in the information providing device.

At the same time, the user can automatically gather information about a facility within a range (a certain distance) centered on himself, and in addition to fixed information displayed conventionally, high-value timely information such as that found in fliers handed out on the street or advertisements folded into newspapers that are delivered can be obtained.

In this manner, according to the portable information system of the present invention, compared to the conventional examples of fixed information for each facility, a communication means is provided that makes possible the exchange of fresh and concise information between the user and the facility.

Furthermore, the portable information system of the present invention is an attempt to provide an area-specific character to the information on the Internet, is a form for use of the Internet between the user and the facility that provides the home page based on this area-specific character (the position at which the user is moving in the region where a facility is present), and opens up new possibilities for the Internet, in contrast to portable information terminals that search for fixed conventional information.

In addition, because the present invention automatically transmits to the portable information terminal information (information about stores and stations within a specified search area) of an area from an information provider facility based on position information even if the user does not know the URL of the home page of the store by using a portable information system that combines the communication network (Internet, etc.) and a position information acquiring means, an information providing service that exhibits a strong area-specific character can be constructed, and since information about stores, train stations, theaters, etc., can be obtained within a specified range centered on the current position, area-specific, concise, and quick (real time) communication between the registered store and user is possible even if the user does not know about the stores, etc., in the region.

DESCRIPTION OF THE PREFERRED EMBODIMENTS

Below, the embodiments of the present invention will be explained referring to the drawings.

First Embodiment

Figure 1:
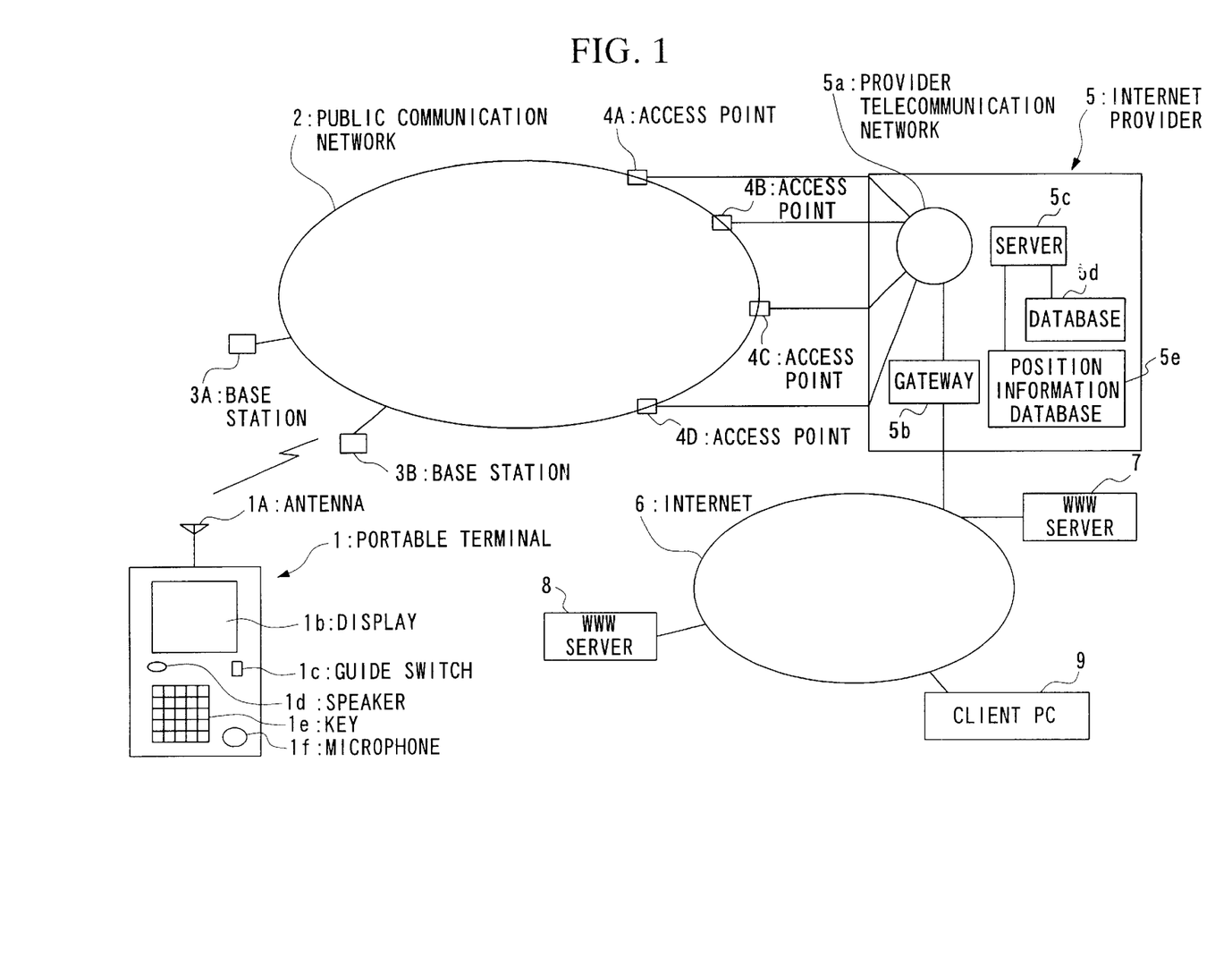
FIG. 1 is a block drawing showing the structure of the portable information system according to the first embodiment of the present invention.

FIG. 1 is a block diagram showing the structure of the portable information system according to the first embodiment of the present invention. In the figure, the portable information terminal 1 has a wireless telephone communication function, like a PHS, for example, and communicates by radio wave via one of the nearby base stations 3A or 3B, for example, the base station 3A and the antenna 1A, which are installed by a telecommunication business that operates a wireless telephone business.

In addition, the portable information terminal 1 has a function for obtaining information about the current position using the GPS using a satellite (not illustrated). Furthermore, the portable information terminal 1 has a display part 1b that uses, for example, an LCD (Liquid Crystal Display) to display the information, a guide switch 1c that outputs a guide control signal that requests area information by the current position information of the GPS to an Internet provider, a speaker id outputting an audio signal, and keys 1e for inputting data such as telephone numbers.

The base station 3A and base station 3B are connected to a public communication network 2 such as ISDN (Integrated Services Digital Network), via an exchange (not illustrated). In addition, the base station 3A and base station 3B carry out connection of the communication line between the public communication network 2 and the portable information terminal 1 via the exchange (not illustrated). A server 5c having database 5d that stores data about subscribers (users), for example, is connected to the public communication network 2 via access point 4A to access point 4D formed by modems and communication servers (not illustrated) located at the Internet provider 5 and a provider communication network 5a.

Thereby, the portable information terminal 1 accesses the server 5c, and in addition, receives the provided communication services, such as acquisition of various types of information and e-mail via the server 5c. The server 5c extracts from a position information database 5e the URLs of stores that are in the area (a specified search range centered on the user) centered on the position represented by the current position information via the public communication network 2 based on a trigger signal (the current position information and the guide control signal) input from the portable information terminal 1 via the public communication network 2. Then, based on these URLs, the server 5c searches the Internet for information about stores within a radius of 10 meters centered on the point shown, for example, in the current position information, and transmits the result of this search to the portable information terminal 1. Here, the guide control signal is a control signal that has the telephone number of the user and requests the transmission of information about stores, etc., in the area centered on the position shown in the current position information to the portable information terminal 1.

That is, by inputting a guide control signal, based on a table showing the current position information and the URLs of stores within a specified area represented by this current position information that is stored in the position information database 5e, the server 5c extracts the URLs of stores within an arbitrary range centered on the input current position information, searches the WWW server 7, the WWW server 8, and the client PC 9 connected to the Internet 6 for information about corresponding stores based on these URLs, and transmits the results to the portable information terminal 1 (the transmission format could also be an email file having the URL attached).

In addition, in the case that new current position information is transmitted, the server 5c searches the WWW server 7, the WWW server 8, and the client PC 9 connected to the Internet 6 for information about stores in a specified range centered on the point represented by this new current position information, and transmits the results of the search to the portable information terminal 1. At this time, it is assumed that the provided information has been registered with the Internet provider by the store, so that a search from the current position information can be carried out.

Here, the information providing method of the information originator, such as a store, is as follows. After requesting the registration on the service company (WWW server 7, WWW server 8) by an Internet provider, the internet subscriber wishing to transmit the information, such as the operator of a store, uses a standard such as HTML (Hypertext, Markup Language), to produce the information to be transmitted. The clients (information originator) can produce this by themselves using a personal computer (client PC). In addition, the client (information originator) only needs to enter the information in a specified format into the personal computer to carry out registration that makes possible inputting information content. The use can also request production of a home page by filling out a form having a standard format and sending it to the service company, for example, by FAX or mail.

Thereby, the portable information terminal 1 displays the image of the relevant URL (the homepage of the store) from information automatically received about the store on the display part 1b. The public communication network 2 connects to the Internet 6 via the communication network 5a of the provider 5 that carries out the connection business to a communication network that includes the Internet. Thereby, the portable information terminal 1 establishes a communication line with the Internet provider 5 via the nearby base station 3B and accesses the Internet 6. That is, the portable information terminal 1 can access the Internet 6 via the gateway 5b of the Internet provider 5.

Figure 2:
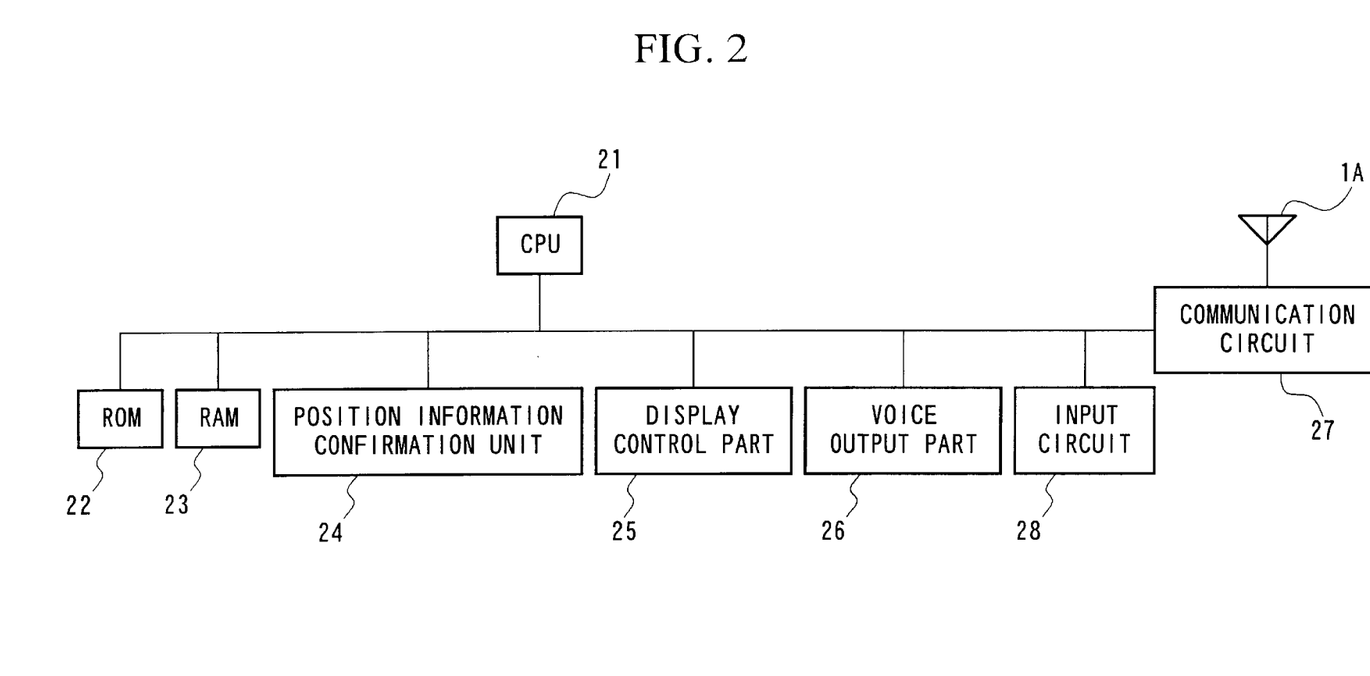
FIG. 2 is a block diagram showing the structure of the portable information terminal 1 in FIG. 1 (or the portable information terminal 10 in FIG. 4).

Next, the portable information terminal 1 will be explained referring to FIG. 2. FIG. 2 is a block diagram showing the structure of the portable information terminal 1. In this figure, the CPU 21 carries out control of each circuit of the portable information terminal 1 explained below by a program stored in the ROM (Read Only Memory) 22. The RAM (Random Access Memory) 23 stores data during the processing carried out by the CPU 21.

When the portable information terminal 1 is in operation, for example, the information position confirmation part 24 finds its own position by continuously tracking the phase of a carrier wave sent from the GPS satellite that is input by the communication circuit 27 via antenna 1A. The display control part 5 displays the image input from the CPU 21 in the display part 1b. The audio output part 26 outputs from the speaker 1d the audio signal of, for example, the voice of the contacted party or a warning sound generated by the CPU 21. The communication circuit 27 is formed from the transmitting part and the receiving part that are connected, and carries out transmission and reception of data by radio wave using an antenna 1A by establishing a communication line with the base stations (base station 3A and base station 3B) of the public communication network 2 in the vicinity of the portable information terminal 1.

The input circuit 28 outputs to the CPU 21, for example, telephone numbers and character data line input from the keys 1e, inputs voice signals from the microphone 1f, and outputs these to the communication circuit 27. In addition, the input circuit 28 detects the ON/OFF state of the guide switch 1c provided on the portable information terminal 1. Furthermore, in the case that the input circuit 28 detects that the guide switch 1 is in the ON state, the input circuit outputs a guide signal to the CPU 1. The CPU 1 outputs a control signal to the communication circuit 27 based on the input guide signal, and establishes a communication line with the access points of telephone numbers (access point 4A to access point 4D) that have been decided in advance.

In addition, after establishing the communication with a specified access point (access point 4A to access point 4D), the CPU 1 transmits current position information and a guide control signal to the server 5c via the public communication network 2 and the provider communication network 5a. At this time, in particular, a guide signal can be output to the CPU 1 by a combination of keys 1e, without providing a guide switch 1c.

Figure 3:
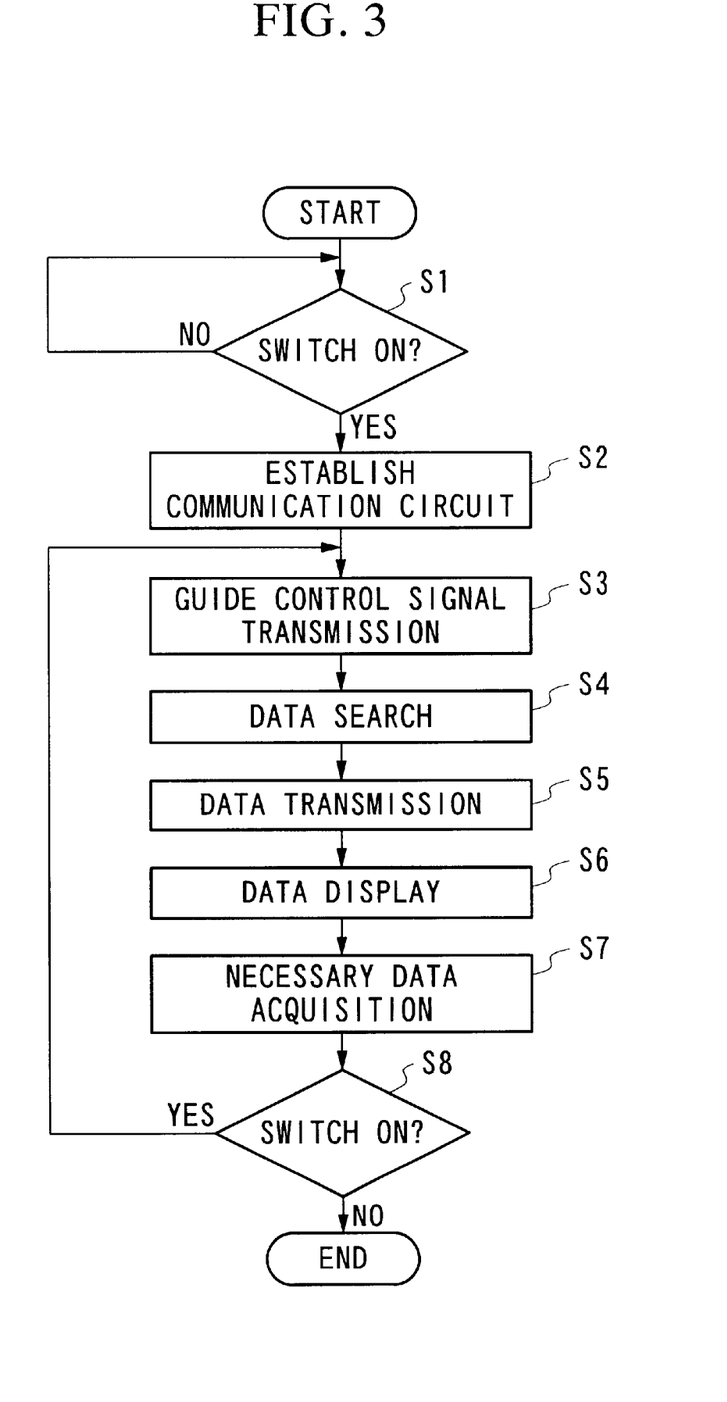
FIG. 3 is a flowchart showing an example of the operation of the portable information system according to the first embodiment of the present invention.

Next, an example of the first embodiment will be explained referring to FIG. 1, FIG. 2, and FIG. 3. FIG. 3 is a flowchart for explaining the operation of the first embodiment.

Assume, for example, that the user is walking through a part of town completely new to him. The user does not know anything about the kind of stores that are nearby, or even if the stores have been identified, whether or not they sell items he needs.

Here, the user turns ON the guide switch 1 of the portable information terminal 1.

In step S 1, the CPU 21 detects whether the guide switch 1c is ON or OFF. In the case that the guide switch 1c detects that the guide switch 1c is OFF, the program returns to step S 1. In contrast, in the case that the CPU 1 detects that the guide switch 1c is ON, the program proceeds to step S 2.

Next, in step S2, the CPU 21 outputs a control signal to the communication circuit 27, telephones the telephone number for the access point 4A, and establishes a communication line with the server 5c via the public communication network 2 and the provider communication network 5a. Then, in the CPU 21, the program proceeds to step S 3.

Next, in step S 3, the CPU 21 reads the current position information from the position information confirmation part 24, and transmits this current position information along with the guide control signal to the server 5c. At this time, because the current position information changes along with the movement of the user, each time the user moves a specified distance, the CPU 21 reads the current position information from the position information confirmation part 24 and transmits it to the server 5c. Then the program proceeds to step S 4.

Next, in step S 4, the server 5c extracts the telephone number of the user of the input guide control signal, and at the same time, based on the current position information, searches on the WWW server 7, the WWW server 8, and the client PC 9, etc., connected to the Internet 6 for information about the stores with URLs corresponding to the input current position information based on a table stored in the current information database 5e that shows the correspondence between the current position information and the URL's of stores that have been registered within the specified area indicated by the current position information.

Next, in step S 5, the server 5c transmits to the portable information terminal 1 information about stores within a specified range of the point represented by the current position information. The range in which stores are searched for (the specified search range centered on the user) can be arbitrarily set by the user by the data input from the keys 1e. That is, by using keys 1e, the user can arbitrarily change the search range from a radius of 10 m (meters) to 20 m, 50 m, 100 m, or 1 km (kilometer), centered on the current position. Thereby, in the case that the user uses the portable information device while walking, the search range can be adjusted to correspond to the time of use in an automobile and public transportation, and the portable information system can be used effectively.

Next, in step S 6, the CPU 21 outputs to the display control part 25 the information (character information, image information) about stores input from the communication circuit 27, and displays the image on the display part 1b. In the case that multiple information items are sent from the server 5c, an index for information about stores is displayed in the display part 1b.

Next, in step S 7, from the index displayed in the display part 1b, the user selects an item that appears to be necessary by using the keys 1e, and can then see the detailed information about the selected store. At this time, in the case that the displayed registered stores are no longer encompassed in the specified search range centered on the user due to the movement of the user, as long as the portable information terminal 1 has not been set to the "maintain display" mode by the keys 1e, the information about the stores no longer in the search range will be deleted from the display 1b. That is, each time the user moves, the information about stores in the specified search range centered on the user is sent from the server 5c and displayed on the display part 1b. At this time, if there is a product among those displayed on the display part 1b that the user wishes to purchase, the user selects the product that is the object of the purchase using the keys 1e, and can thereby place an order with the registered store via the server 5c.

In step S 8, the CPU 21 detects whether the guide switch 1c is ON or OFF. In the case that the CPU 21 detects that the guide switch 1c is OFF, the CPU 21 cuts off the communication line with the Internet provider 5, and ends the program. In contrast, in the case that the CPU 21 detects that the guide switch 1c is ON, the program proceeds to step S 3. The above flow from step S 1 to step S 8 is repeated.

The above-described explanation was carried out only for detecting information about stores, but in detail, the following types of information can be obtained.

When the user is walking in the vicinity of a movie theater, information about the movie that is playing, the playtimes, the seating conditions and the next movie scheduled are displayed, and if necessary, tickets to the next scheduled movie can be bought using the portable information terminal 1.

When the user is walking in the vicinity of a bakery, the time that each type of bread is baked and the daily special products and prices are displayed.

When the user is walking in the vicinity of a station, the departure schedule for the next train and disruptions of the schedule due to accidents and the like can be received, and in addition, when necessary, reservations for reserved seats on the train can be made using the portable information terminal 1.

When the user is walking in the vicinity of a boxed lunch outlet, the daily boxed lunch menu and prices are displayed.

When the user is in the vicinity of a lottery ticket sales booth, the previous winners, types of lottery tickets currently on sale, and the next scheduled sale of tickets are displayed.

When the user is in the vicinity of a museum, the contents of the exhibition and fees are displayed, and while walking through the museum, the explanation of the exhibited pictures can be read.

When the user is walking in the vicinity of a theater, the title of the play, the starting time, seating information, the price of tickets, and the length of the run can be found out.

When the user is walking in the vicinity of a hotel, information about vacancies, the types of rooms, and the rates for each room are displayed.

When the user is walking in the vicinity of a restaurant, information about the types of lunches and the prices are displayed.

When the user is walking in the vicinity of a department store, information such as bargain sales, eye-catchers, the floor on which bargains are located, and the period of sales, is displayed.

When the user is walking in the vicinity of a personal-computer shop, information such as the inexpensive types of computers, bargain priced items, and prices are displayed.

When the user is walking in the vicinity of a real estate agent, recommended condominiums, their layout, and their prices are displayed.

When the user is walking in the vicinity of a bar, the types and prices of the drinks and food are displayed, and the facility is introduced by audio output.

When the user is driving on the road, information about open spaces in car garages and parking charges, for example, is displayed.

When the user is in the vicinity of a scenic spot, tourist information about historical sites, the history of the site, and accommodation guidance is displayed.

When the user is traveling in the vicinity of a store, the operating hours of the store can be referenced, and the user can know that the store is closed without going there.

The transmission of the above information about stores and stations, for example, is assumed to be registered with the information provider 5 and stored in the table of the position information database 5e.

As described above, according to the first embodiment of the portable information system, by constructing an information-providing service system using a portable information terminal that combines the Internet and a position information acquisition system, even if the user knows nothing about the stores in an area, because information about the stores, train stations, and theaters, for example, in the specified range centered on the current position can be obtained, concise and timely (real-time)communication between the user and the registered stores the within the area is possible.

Moreover, the above described portable information system can also use a personal computer at a fixed site such as a home or company, not just a portable information device. In this case, the user can obtain information about stores and train stations, for example, in the necessary search range without worrying about the URL.

In addition, conventional home pages of shops on the Internet, which is a virtual space, lack the reality of a store having a location, and thus mail order has been their object. However, according to the present invention, by closely connecting the Internet and a local area, people walking in front of stores and residents of the area (users), without knowing URLs, for example, can receive transmission of announcements from the store in real time. Conventionally, stores did not aggressively produce home pages because they were not directly connected with sales, but compared with distributing advertising fliers to users, home page users will continue to increase, and users will be able to obtain information about stores in a vicinity easily because the production efficiency of advertising will increase.

In addition, for example, in the portable information terminal 1 of the above described first embodiment, a position information confirmation part 24 using the GPS was used. However, in place of the GPS, a position information confirmation device that detects position information of the portable information terminal 1 based on the identification number (ID) of a base station while in use can also be used.

Furthermore, for example, as a position information confirmation means, the VICS (vehicle information and communications system) that sends common information (including position information) to an automobile from a beacon installed at a specified position on a road can be used.

Above, a detailed description of the first embodiment of the present invention was made referring to the figures. However, the specific structure is not limited to this embodiment and to the extent that they do not depart from the gist of the present invention, these structures are included in the present invention.

Second Embodiment

Figure 4:
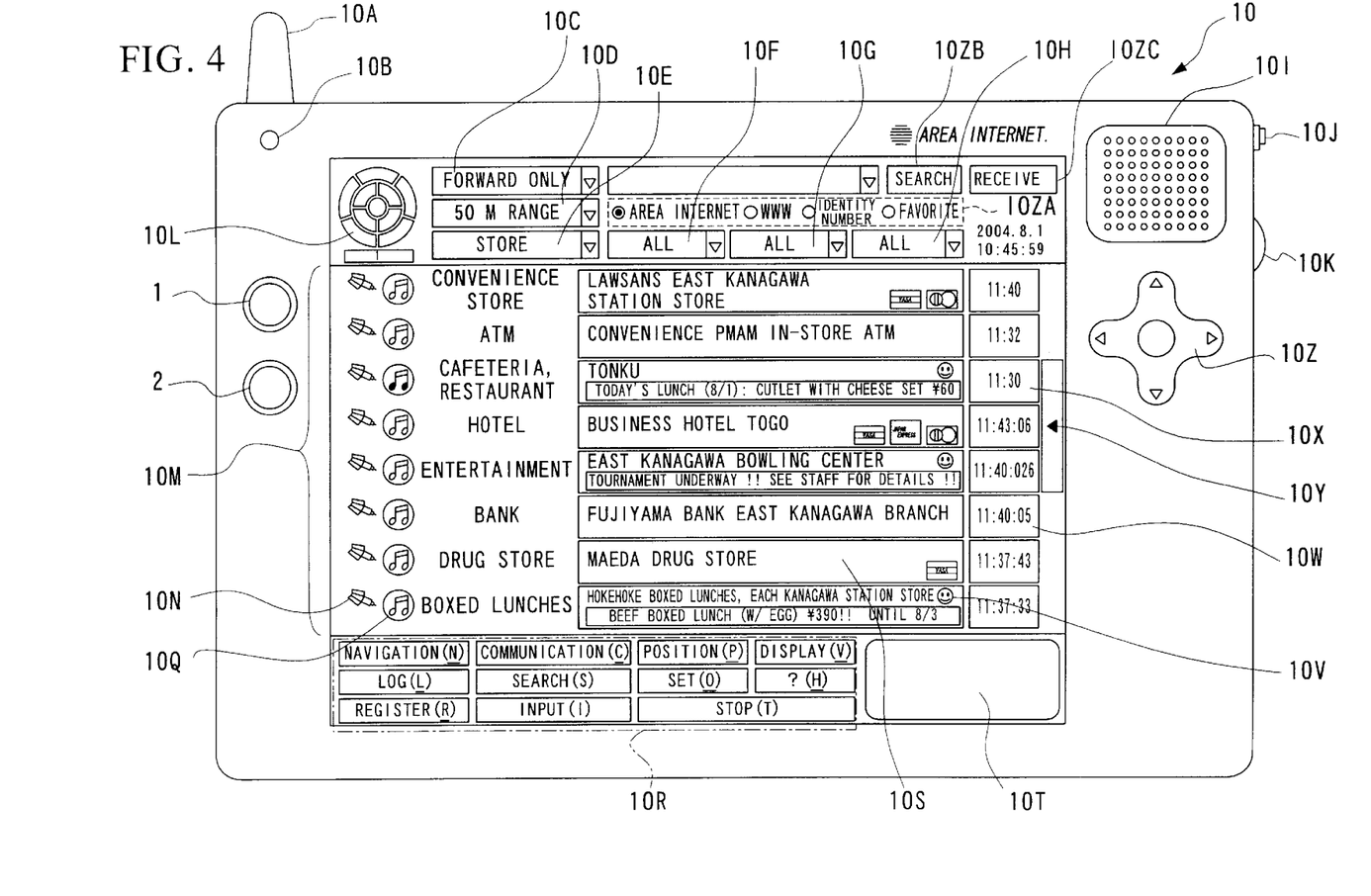
FIG. 4 is a frontal view of the portable information terminal 10 according to the second embodiment of the present invention.

Instead of the portable information terminal 1 shown in FIG. 1, the portable information terminal 10 shown in FIG. 4 can also be used. FIG. 4 is an exterior view showing the front of the portable information terminal 10.

The structure of the portable information system of the second embodiment is the same as that of FIG. 1, and in addition, the block structure of the inner circuits of the portable terminal 10 is identical to the structure of the portable information terminal 1 of the first embodiment shown in FIG. 1

However, in the second embodiment, the program stored on the ROM 22 for operating each component of the portable information system in FIG. 1 and each component of the portable information terminal 10 in FIG. 2 are modified, and new functions are added to each component of the first embodiment. Below, the newly added functions and operations will be explained. Functions and operations that are not explained are identical to those of the first embodiment.

Figure 5:
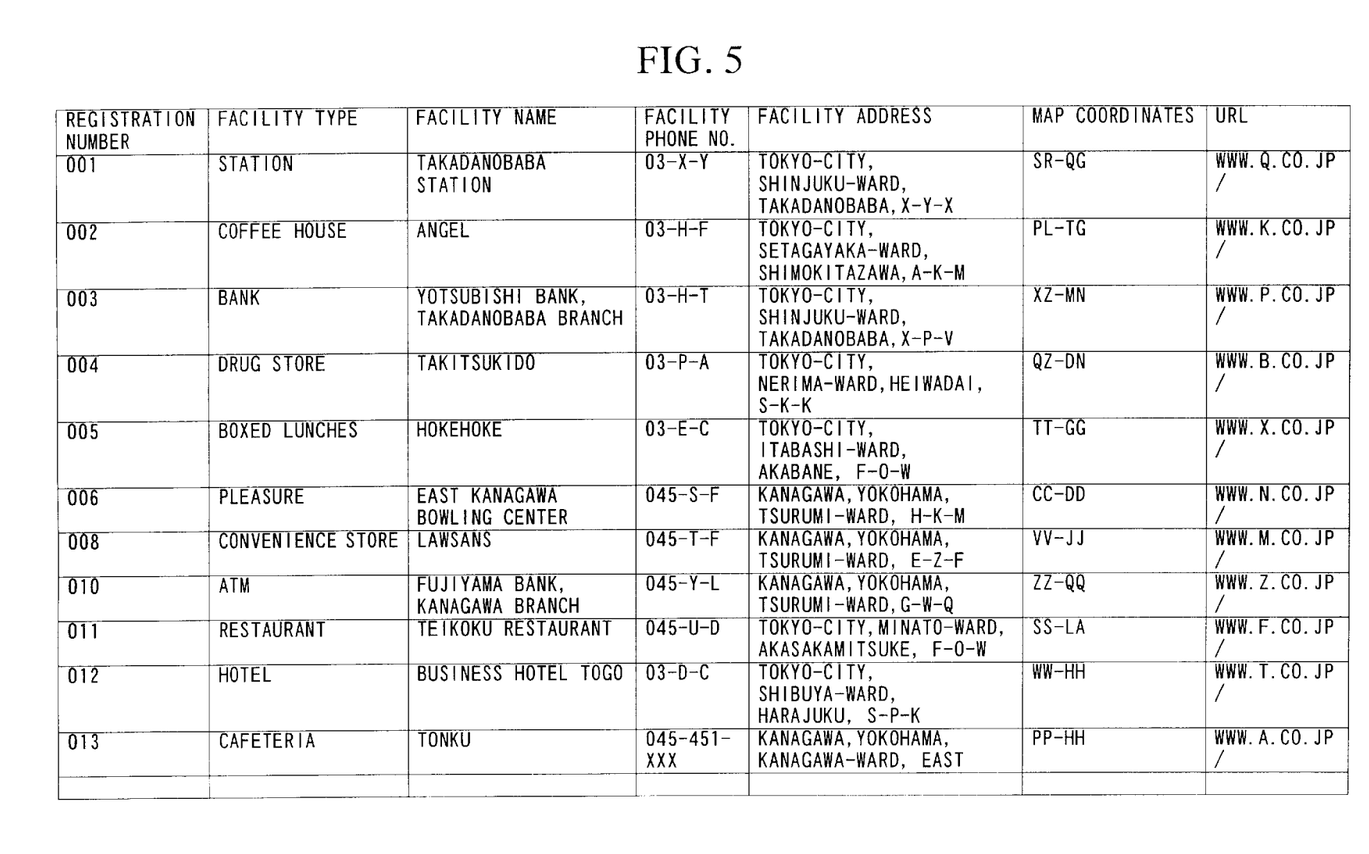
FIG. 5 is a drawing showing the data format of the facility database in the portable information system according to the second embodiment.
Figure 6:
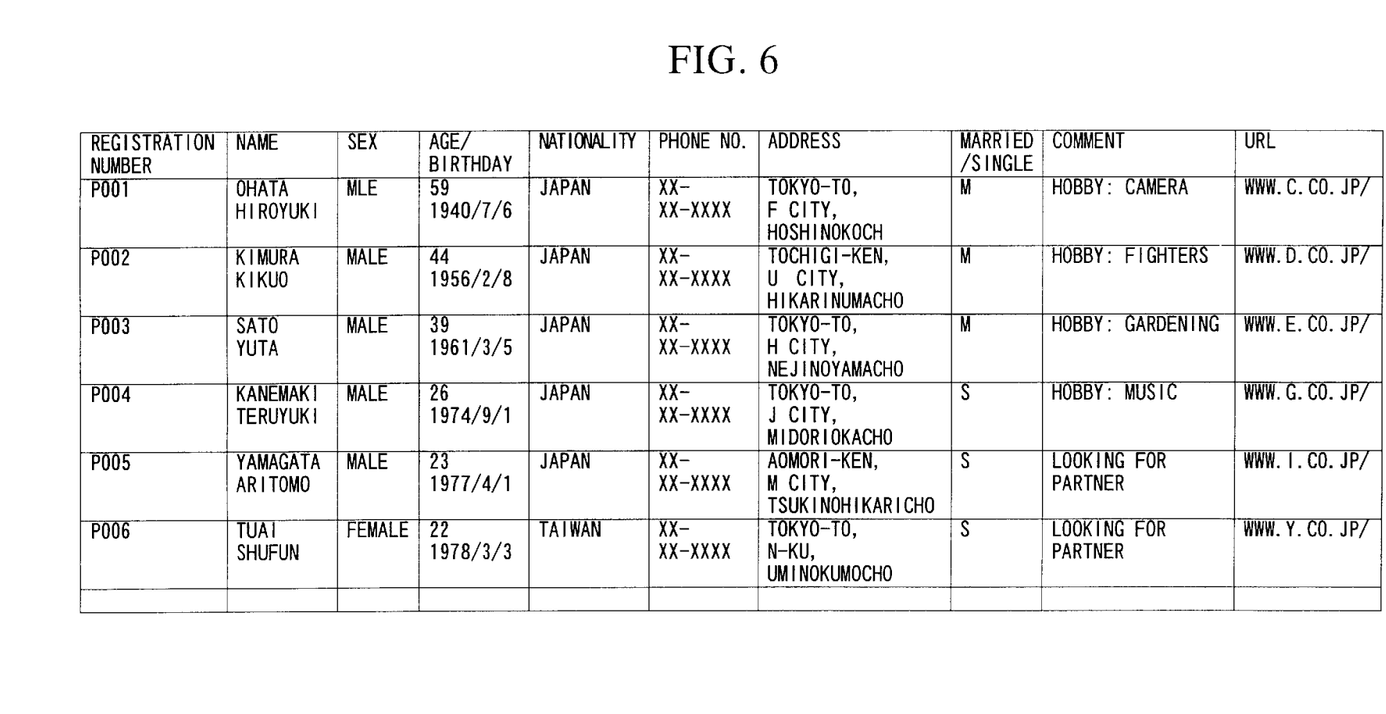
FIG. 6 is a drawing showing the data format of the personal database in the portable information system according to the second embodiment.

In the database 5d of FIG. 1, a database of records shown in FIG. 5 and FIG. 6 are stored.

FIG. 5 shows the storage format of the facility database for each facility recorded in the portable information system.

Specifically, items in the facility database include, for example, registration number, facility type, facility name, telephone number of the facility, address of the facility, map coordinates, and URL, and each of these items is used as a search key in a search of the database 5d.

As registration numbers, the registration sequence numbers such as "001", "002", and "003", . . . are displayed (stored).

As the facility type, the name of the classification (classification name) that classifies facilities, such as "train stations", "coffee shops", "banks", "drugstores", into each category, is displayed.

As the facility named, the names of each facility, such as "Takadanobaba" corresponding to the classification "train station", "Angel" corresponding to the classification "coffee shop", and "Yonbishi Bank, Takadanobaba Branch" corresponding to the classification "bank", are displayed.

As the facility telephone number, the telephone number of each facility is displayed. For example, the telephone number 03-X-Y-Z is displayed for "Takadanobaba Station".

As the facility address, the address of each facility is displayed. For example, "Tokyo City, Shinjuku Ward, Takadanobaba X-Y-Z" is displayed for "Takadanobaba Station".

As the map coordinates, the positional coordinates in the map data are stored in the position information database 5e. The position coordinates "SR (longitude)—QG (latitude) is displayed for "Takadanobaba Station".

As the URL, the URLs for each of the facilities are stored.

In addition, FIG. 6 shows the storage format of the personal database in which information about each individual user registered in this portable information system is stored.

Specifically, the following items, for example, can be used as search keys in a search of the database 5d: "registration number", "name", "sex", "age/birthday", "nationality", "telephone number", "address", "single/married", "comments", and As the registration number, the numbers of the user registration order such as "P001", "P002", "P003" can be displayed (stored).

As the name, the names of each individual user are displayed for each registration number. For example, "Ohbatake Hiroyuki" can be displayed as the user for the "registration number" "P=001".

As sex, the character data of "male" and "female" that shows whether the registered user is a male or female is displayed.

As nationality, the name of the country corresponding to the nationality of each user is displayed. For example, "Japan", which shows the nationality of "Ohbatake Hiroyuki" is displayed for registration number P001.

As the telephone number, the telephone number corresponding to each registered user is displayed. For example, the telephone number "XX-XX-XXXX", corresponding to the name Obatake Hiroyuki is displayed.

As an address, the address of each user is displayed. For example, "Tokyo City, F Shiseinokocho", which is the address of the house of Obatake Hiroyuki and corresponds to the registration number P001 is displayed.

As single/married, the marital status single or married is displayed for each user. For example, "single" is displayed for Tuai Shuku Fun, whose registration number is P006.

As a comment, comments about each user are displayed. For example, the character data "searching for a partner" for Yamagata Aritomo, corresponding to registration number P005, is displayed.

As the URL, the URL of each user is stored. For example, the URL "www.i.co.jp/" is displayed as the URL of Yamagata Aritomo, corresponding to the registration number P005.

Next, the basic operation of the portable information terminal 10 is explained referring to FIG. 4 and FIG. 2.

In the operation of the portable information terminal 10 below, a CPU 21 controls a structure comprising the RAM 23 to the communication circuit 27 according to a program in the ROM 22. Data such as calculations in progress are temporarily stored in the RAM 23.

Reference symbol 10 A is a wireless antenna, and converts the input radio waves to electrical signals and outputs them to the communication circuit 27. The transmitted signals input from the communication circuit 27 are broadcast.

Reference symbol 10 B is a receiving state display lamp, and displays that radio waves have been transmitted via the Internet provider 5 (FIG. 1). In addition, the received state display lamp 10 B is controlled by the display control part 25, and displays a blue color when radio waves are being received, in contrast to the normal red color.

The portable information terminal 10 shifts to the search mode by the user clicking the search button 10 ZB, and thereby, the user can use each search function in the area 10 ZA.

Here, in area 10 ZA, the selection buttons "Area Internet", "WWW", "identification number", and "favorites" are present, and in the case that the functions explained below are used, by using the cursor movement switch 10 Z, the user can move the cursor to the selection button "Area Internet", and click the selection button "Area Internet".

Thereby, the portable information terminal 10 shifts to the operation mode "Area Internet", explained below, connects through a line with the Internet provider 5, and transmits a service request signal that requests a service in the operation mode "Area Internet".

As a result, the server 5c of the Internet provider 5 provides the service of the operation mode "Area Internet", explained in detail below, to the user who requested the service based on the above-described input service request signal.

In addition, by the user moving the cursor to the selection button "WWW" and clicking, the portable information terminal 10 shifts to the operation mode that carries out a normal search of the Internet. That is, the portable information terminal 10 displays the search engine screen for carrying out a normal Internet search.

Furthermore, by the user moving the cursor to "identification number" and clicking, the portable information terminal 10 shifts to the operation mode that carries out the operation of searching for a user from the registration number.

In addition, by the user moving the cursor to the selection button "favorites" and clicking, the portable information terminal 10 shifts to the operation mode "Area Internet", and only the facilities that the user has registered as "favorites" are searched on the facility database by the server 5c, and as described below, the contents are displayed on display part 10 M.

In addition, by the user clicking the button 10 ZC, the portable information terminal 10 shifts from the search mode to the normal Internet mode.

Reference symbol 10 C is a search direction setting menu, and when carrying out a search of stores, for example, the user sets the search direction to forward with respect to the user himself. Selection setting items can include, for example, all directions, forward, right, left, and backward.

The result of this selection is transmitted to the provider as a search direction control signal via the communication circuit 27.

Reference symbol 10 D is a search distance setting menu, and is set by selecting a radius (for example, 5 M, 10 M, 30 M, 50 M, 100 M, 1 KM) of a circular search area centered on the user (the portable information terminal 10).

In addition, the search area is determined by the radial direction of the area of the search (search distance) and the above-described direction of the search (search direction).

In addition, the search area panel 10 L carries out display corresponding to the selected direction and distance for visually notifying the user of the above selected result in the real mode displaying the set direction indicated by the search. That is, the display control part 25 carries out control so that the panel corresponding to the selected area is displayed in red (the ON state) and the panel corresponding to the area not selected is displayed in pink (the OFF state).

Furthermore, the search direction and the search range can be set using this search area panel 10 L.

That is, the search area panel 10 L serves as an ON/OFF switch, and by the cursor movement switch 10 A moving the cursor, pressing and clicking the center part of the cursor movement switch 10 A, the panel displays the ON state (red light) and when clicked again, displays the OFF state (pink light).

The search direction set above is displayed on the search direction setting menu 10 C, and the search distance is displayed on the search distance setting menu 10 D by the CPU 21.

At this time, by the search direction setting, the above-described search area takes the form of a semicircle or a fan shape, not a complete circle. The forward direction, that is, the forward direction of the user, is set as the forward direction. The position information confirmation part 24 identifies the forward direction based on the distance information of two points at a constant time interval (for example, every thirty seconds, and the numerical value of this period can be changed arbitrarily by the user).

The result of the above selections is transmitted to the provider as a search distance control signal via the communication circuit 27.

Next, the following selection processing of the search object is carried out by the user shifting and clicking the cursor movement switch 10 Z (the search type 1 setting menu 10 E, the search type 2 setting menu 10 F, the search type 3 setting menu 10 G, the search option setting menu 10 H, etc.). By clicking each of the selection menus, a plurality of search object types is displayed, and by selecting these types in sequence, the facilities to be searched for can be limited.

The results of the above selections are transmitted to the provider as search distance control signals via communication circuit 27.

Reference symbol 10 E is the search type 1 setting menu, and the user selects the type of facility to be searched for.

For example, in the search type 1 setting menu 10E, the user can select the facilities to be searched for from among items such as "stores", "public transportation", "public facilities", "persons", "hospitals", and "industries".

The result of this selection is transmitted to the Internet provider 5 as a search type 1 control signal via the communication circuit 27.

Reference symbol 10 F is the search type 2 setting menu, and the user selects various types of facilities for which a search is to be carried out.

For example, when "stores" is set in the above search type 1 setting menu 10 E, in the search type 2 setting menu 10 F, the user can set the "store" to "convenience store", "ATM", "cafeteria/restaurant", "hotel", "entertainment/gambling", "bank", "drug store", or "boxed lunch store", or select "all" types which are included in "stores".

In addition, when "transportation" is set in the above search type 1 setting menu 10 E, in the search type 2 setting menu 10 F, the user can set "transportation facilities" to "station", "bus stop", "port", "airport", or select "all" types which are included in "transportation".

Furthermore, when "public facilities" is set in the above search type 1 setting menu 10 E, in the search type 2 setting menu 10 F, the user can set "public facilities" to "government offices" (including city offices, regional offices, metropolitan offices), "city hall", "town hall", "village hall", "post office", "library", or "art museum", for example, or select "all" types which are included in "public facilities".

In addition, when "hospitals" is set in the above search type 1 setting menu 10 E, in search type 2 setting menu 10 F, the user can set "hospitals" to "internal medicine", "surgery", "gastrointestinal department", "ophthalmology", "otolaryngology", "gynecology", "pediatrics", "dentist", or "general hospital", for example, or select "all" types which are included in "hospitals".

The result of these settings is sent to the Internet provider 5 as a search type 2 control signal via the communication circuit 27.

Reference symbol 10 G is a search type 3 setting menu, and, for example, when "bank" is set in the above search type 2 setting menu 10 F, the user indicates that a search is to be carried out for the head office or a branch office of a bank where the user has an account, or the location of an ATM.

In addition, when "entertainment/gaming" is set in the above search type 2 setting menu 10 F, in the search type 3 setting menu, the user indicates a search is to be carried out, for example, of "movie theaters", "bowling alleys", "pachinko parlors", "game centers", "karaoke", "billiard halls", "massage parlors", "lottery ticket agents", "horse race ticket agents", "bicycle race ticket agents", "archery halls", "baseball", and "theme parks".

The results of these settings are transmitted to the Internet provider 5 as a search type 3, control signal via the communication circuit 27.

Reference symbol 10 H is a search option setting menu, and among the items set in the search type 1 setting menu 10 E to the search type 3 setting menu 10 G, settings are carried out for the condition of the facility that is the desired search object.

For example, in the search type 1 setting menu 10 E, when "store" is set, search options can be, for example, "display only open stores", "display only stores having sales", "display only stores serving lunches", "display only stores where credit cards can be used", and "display only stores that allow being accompanied by pets."

The results of these settings is transmitted to the Internet provider 5 as a search option control signal via the communication circuit 27.

For the operation of the data input from each of the above setting menus, the data input from each of the setting menus is output from the input circuit 28 to the CPU 21, and the CPU 21 carries out control of the portable information terminal 10 as a whole based on this input data, and the user selects and sets from among these types matching the use pattern.

The speaker 10 I is controlled by the audio output part 26, and outputs as sound the audio data sent from the Internet provider 5 and audio data stored in the ROM 22.

The earphone jack 10 J outputs the same audio as the audio output from the speaker 10 I when the earphone is connected. When the earphone is connected, audio output from the speaker 10 I is stopped.

The volume switch 10 K adjusts the volume (high and low level) of the audio output from the speaker 10 I and the earphone jack 10 K.

The contents display 10 M is the area that carries out image display, and the target switch 10 N, the audio information switch 10 Q, the menu button 10 R, the target display panel 10 S, the character input recognition part 10 T, the favorites registration mark 10 V, the transit time stamp 10 W, the anticipated transit time stamp 10 X, and the current position display indicator 10 Y are displayed under the control of the display control part 25.

At this time, the image data displayed in the contents display part 10 M is image data stored in the ROM 22 and image data sent from the Internet provider 5.

For the operation of the data input from the contents display part 10 M explained below, the data input from the input circuit 28 is output to the CPU 21, and control of the portable information terminal 10 as a whole is carried out based on the data input by the CPU 21.

The target switch 10 N is shifted from an OFF state (gray color display) to an ON state (red color display) by moving the cursor using the cursor movement switch 10 Z, and selecting target switch 10 N by clicking.

The above ON state denotes that state in which the search target is indicated, and, for example, in the automatic position display mode that displays the positional relationship between the portable information terminal 10 and the target, the direction and distance of the store selected as the target are displayed on the search area panel 10 L. In the use mode of the search area panel 10 L, the switching between the real mode and the automatic position display mode is carried out by sequentially switching by double clicking and moving the cursor with the cursor movement switch 10 Z to the position of the search area panel 10 L.

The direction displayed in this search area panel 10 L is with respect to the direction of the forward movement of the user, and the distance from the user is calculated by the server 5c based on the value obtained by converting the position that the position information confirmation part 24 has detected (the longitude and latitude as units) to a coordinate position on the map data stored in the position information database 5e and then calculating the distance to the coordinate position of the target on the data map stored in position information database 5e. The distance data found by this calculation is transmitted to the corresponding portable information terminal 10.

In addition, the calculation of the distance that a user has moved is carried out by converting the position detected by the position information confirmation part 24 at a first measurement time and a position detected by the position information confirmation part 24 at a second observation time to coordinate positions on map data stored in the position information database 5e, and calculating the difference between these respective coordinate positions.

The coordinate position used above is formed using, for example, M (meters) or K (kilometers) as a unit of distance.

Below, the calculation that finds the distance is carried out by the above-described process.

In addition, when the distance between the store that is the target sent from the Internet provider 5 and the user falls within a certain distance (for example, 100 M), a chime sound from the audio data stored in the ROM 22 is output from the speaker 10 I.

At this time, the portable information terminal 10 searches for the URL of the target store, opens the home page of this store, and the image data of this input home page is displayed on the contents display 10 M.

Thereby, the portable information terminal 10 notifies the user that he or she is approaching a target store.

When the audio information switch 10 Q is clicked by moving the cursor with the cursor movement switch 10 Z, the output of the audio information (for example, an introduction to each facility, the stores advertisement, etc.) of the target homepage selected by the above-described target switch 10 N is turned ON.

At this time, by control of the CPU 21, in the ON state the audio information switch 10 Q is displayed in red, and in the OFF state, the audio information switch 10 Q is displayed in pink.

Thereby, an HTML extension tag coded in the home page, and by a function that extracts only audio information that can be interpreted in a dedicated browser (distributed to each user), the corresponding audio information is extracted from the home page on the web to which the user is connected. Thereby, in the case that the target falls within a certain distance, the audio output part 26 inputs data in the HTML format sent from the Internet providers 5, as explained for the above-described target switch 10 N, and the audio information extracted from this data is output from the speaker 10 I.

In contrast, in the case that the audio information switch is OFF, the audio output part 26 does not output this extracted audio information from the speaker 10 I.

In addition, by double-clicking the audio information switch 10 Q, the CPU 21 turns the audio output function ON, and outputs the audio control information to the Internet provider 5 via the communication circuit 27. At this time, the audio information switch 10 Q is displayed in blue.

Thereby, the server 5 searches for the URL of this facility in the facility database in the database 5d based on the data showing the selected facilities included in the audio control signal, and connects the line of the user's portable information terminal 10 to this URL.

In addition, the display control part 25 outputs from the speaker 10 I audio information extracted by the above-mentioned dedicated browser from the data of the home page input from the Internet provider 5. For example, in the case of a cafeteria or restaurant, there is the announcement "Today's lunch menu"; or if the facility is closed, there is the announcement notifying the users about the condition of the facility, for example, that "Today we are closed"; or if a store is having a bargain sale, there is an announcement notifying the user about bargain items, such as "Today, an XXX is being sold at Y % off!".

At this time, in the HTML data, in the case that the audio data is not prepared (stored) with the extension tag with which the dedicated browser carries out the extraction processing, the CPU 21 outputs from the speaker 10 I a buzzer sound (stored as audio data in the ROM 22) that represents an error in order to notify the user that there is not audio data to be output form the speaker 10 I in the connected home page.

In the target display panel 10 S, the information about the sites (for example, the facility name) selected by the user in the portable information terminal 10 is displayed by the control of the display control part 25 corresponding to the target switch 10 N and the audio information switch 10 Q.

Here, the information about each of these facilities displayed in the target display panel 10 S is information about facilities searched for in the facility database in the database 5d by the server 5c based on conditions set in the search direction setting menu 10 C, the search distance setting menu 10 D, the search type 1 setting menu 10 E, the search type 2 setting menu 10 F, the search type 3 setting menu 10 G, and the search option setting menu 10 H.

At this time, when the server 5c detects that a new facility in the indicated search type in the portable information terminal 10 has come within a closer distance than any other facility currently displayed in the target display panel 10 S of this portable information terminal 10, the server 5c searches for new information about facilities in the facility database and transmits it to the portable information terminal 10.

Thereby, the CPU 21 deletes the information about the facility that has become distant from the portable information terminal 10, and replaces the information for each facility (for example, the name of the facility) displayed in the target display panel 10 S with the information input from the Internet provider 5 about facilities that have become close.

That is, in the target display panel 10 S, when the user passes near a new facility included in the indicated search type, information about the new facility is automatically displayed (by the interactive control of the Internet provider 5 and the portable information terminal 10), and at the same time the information about the facility that has become distant is deleted.

Thus, in the case that the user having the portable information terminal 10 moves to an area where there are many facilities in the vicinity, such as an urban area, the information about facilities displayed on the target display panel 10 S is updated depending on the speed at which the user is walking.

For example, in the uppermost part of the portable information terminal 10, the target display panel 10 S displays information about the facilities that are becoming close in the forward direction, while simultaneously scrolling information about facilities becoming distant in the downward direction on the portable information terminal 10.

In addition, at this time, the CPU 21 displays the type name that would be chosen in the search type 2 setting menu 10 F based on the information about the facility input form the Internet provider 5 in proximity to the left side of the target display panel 10 S. For example, when the target display panel displays the name "Tonkyu", cafeteria/restaurant is displayed.

The display of this target display panel 10 S updates and displays the color of the display part by the CPU 21 based on the facility open information that indicates whether the corresponding facility input from the Internet provider 5 is open or closed. For example, if the facility is open, a light gray color is displayed, and if the facility is closed, a dark gray color is displayed. This facility open information is included in the facility database (not illustrated).

In addition, in the target display panel 10 S, the CPU 21 displays the image of the registered favorites mark 10 V superimposed on this display.

This registered favorites mark 10 V is displayed by the user moving the cursor by the cursor movement switch 10 Z, selecting the target switch 10 N of the facility to be registered, and sending a registration signal to the Internet provider 5 by clicking the register button on the button panel 10 R. The server 5c registers the facility in the user's favorites area corresponding to the personal database of the database 5d.

In addition, not only is the registered favorites mark 10 V displayed superimposed in the target display panel 10 S that displays the registered favorites, but advertisements for each facility are also displayed.

For example, in the target display panel 10 S, in the lower part that displays the character data of the name "Tonkyu" of the "cafeteria/restaurant" that is the "store", the character data, for example, "Today's lunch (8/1): Cutlet with cheese set ¥600" stored corresponding to "Tonkyu" is displayed.

In addition, similarly, for facilities that allow payment by various types of credit card (including debit cards), an image allowing confirmation of the credit cards that can be used is displayed.

Furthermore, when the user wishes to stop the updating operation for information about facilities displayed in the above-described target display panel 10 S, by moving the cursor to the stop button in the menu button 10 R and clicking it, the user's stop request is detected by the input circuit 28, and the updating operation can then be stopped by the CPU 21.

Furthermore, the current position display indicator 10 Y is a reference display that shows a current position that moves along with the movement of the user, and is displayed in proximity to the right side of the target display panel 10 S in which the facilities that are the closest distance to the current position of the user are displayed.

In addition, when the cursor is moved by the cursor movement switch 10 Z and the target display panel 10 S is clicked, the CPU 21 detects that a map image display has been requested, and sends to the Internet provider 5 a map data request signal that requests the map data for the area having the selected target at the center. This area is determined by the search distance set in the search distance setting menu 10 D.

Thereby, the server 5c extracts from the position information database 5e the map data of the area having the target at the center based on the map data request signal that has been input, and transmits this map data to the portable information terminal 10.

In addition, the CPU 21 displays the input map data in the contents display part 10 M.

In addition, when the user moves the cursor by the cursor movement switch 10 Z and double clicks the selected target display panel 10 S, the CPU 21 transmits to the Internet provider 5 the access request signal that requests access to the home page of the facility selected by the double click.

Thereby, the server 5c connects the line of the portable information terminal 10 to the URL of the target included in the access request signal.

As a result, the CPU 21 displays the image of the home page produced by the target facility to which the line has been connected in the contents display part 10 M of the portable information terminal 10.

Additionally, the transit time stamp 10 W is displayed in blue in proximity to the right side of the target display panel 10 S, and displays the time the user passes by the facility of the indicated search type (target).

This time is displayed in the transit time stamp 10 W by a time circuit (not illustrated) inside the portable information terminal 10 or by the CPU 21 using the time information sent from the Internet provider 5.

In addition, an anticipated transit time stamp 10 X is displayed in yellow in proximity to the right side of the target display panel 10 S corresponding to each facility, and displays the anticipated time that the user will pass by each target.

This anticipated time is found by the server 5c dividing the distance between the user (the portable information terminal 10) and the target by the movement speed of the user.

In addition, the movement speed used here is found by the server C, which divides the movement distance by the above-mentioned specified time interval. This movement distance is the distance that the user has moved in a specified time (for example, 30 seconds).

The Internet provider 5 transmits this anticipated time to the portable information terminal 10, and the CPU 21 displays the input anticipated time in proximity to the right side of the target display panel 10 S that displays the corresponding target.

Next, when the user selects "individual" in the search type 1 setting menu 10 E, a mode is entered in which a search is carried out for users that are carrying the same type of portable information terminal 10.

The setting operation of the search direction and search range (search area) in the search type 1 setting menu 10 E is the same as in the case of selecting the other types.

At this time, by writing the conditions of the time of the search in the area for comments in the personal database in advance, the server 5c extracts the words from the character data of these comments, and extracts an individual described by the data in another personal database that matches comments including similar to these words in the range of the search area (for example, within a vicinity of 100 M) and the conditions (for example, sex, age, nationality, marital status) expressed in these words.

For example, when in the comments of a female user, "male", "bachelor (single)" and "looking for a partner", in addition to "Aquarius" and "Japanese" are recorded, the server 5c extracts "Yamagata Aritomo", whose registration number is P005, described by the character data as a Japanese unmarried man, including the comment "looking for a partner", and transmits the individual data about "Yamagata Aritome" to the female users portable information terminal 10.

Thereby, in the portable information device 10 possessed by a woman, the CPU 21 outputs a chime sound from the speaker 10 I and displays on the target display panel 10 S the individual data of "Yamagata Aritomo" and other users that match the search conditions.

That is, the server 5c analyzes the sentences that the user has written in the comment, and by extracting the words, the data corresponding to these words is stored in the personal database, and the individual data of other users in the search area that the user has set is displayed in the target display panel 10 S of the users portable information terminal 10 S.

In addition, the user moves the cursor using the cursor movement switch 10 Z, double-clicks the target display panel 10 S that displays the personal information of other attractive users, and thereby can open the home page of the other users.

At this time, processing that opens the other users home page is carried out that is similar to the processing described above that is carried out when double-clicking the target display panel 10 S displaying the facility in order to open the home page of a targeted facility.

In addition, the user moves the cursor with the cursor movement switch 10 Z and clicks on the target display panel 10 S that displays the personal information of other attractive users, and thereby the map data of the area centered on these other users is displayed in the contents information part 10 M.

At this time, processing that opens the map information of the area centered on the other users is carried out that is identical to the above-described processing carried out when the target display panel 10 S that displays the facility is clicked in order to display the map data of the area centered on the facility that is the target.

In the above-described individual search, collecting and managing the information about each individual can be carried out via a particular wedding consultation agency (company). That is, a web server is provided at a wedding consultation agency, and a personal database is built in the connected database.

In addition, this wedding consultation agency collects data of users searching for a marriage partner and individual data only for users who have passed a screening examination without any problems, and has responsibility for monitoring statistical information based on user access (the type of work and age of the person accessing, etc.) and the collected personal information, and carries out the processing as a whole for individual searches assuming that the individual desires to marry.

In addition, when meeting friends, users meeting each other set each other as the target by moving the cursor by the cursor movement switch 10 Z and by clicking the target display panel 10 S that displays the other's personal information.

Thereby, using the distance information from the Internet provider 5, for a plurality of setting distances (for example, 100 M, 50 M, 30 M, 1 M, etc.), the CPU 21 notifies the user of the portable information terminal 10 when the friend has entered in each area with different chime sounds.

In addition, the users can search for each other in a place where the position information confirmation part 24 is in operation.

Next, an example of the portable information system according to the second embodiment will be explained referring to FIG. 1, FIG. 2, and FIG. 4.

As shown in FIG. 4, the user sets the search direction setting menu 10 C to "forward", the search distance setting menu 10 D to "50 M", the search type 1 setting menu 10 E to "stores", the search type 2 setting menu 10 F to "all", the search type 3 setting menu 10 G to "all", and the search option setting menu 10 H to "all".

In addition, the user clicks the button 10 ZA, and after shifting the portable information terminal 10 to search mode, clicks the select button of the "Area Internet" in area 10 ZA.

Thereby, the CPU 21 detects that the user has requested an operation in the "Area Internet" operation mode, connects the line with the contracted Internet provider 5, and transmits the service request signal.

At the Internet provider 5, the server 5c detects the user's service request by the service request signal being input, and subsequently provides the service of the "Area Internet" operation mode.

Next, the server 5c detects stores (contracted with the Internet provider) that are within 50 M of the user's forward direction based on the search settings set by the user from the map data in the position information database 5e, and transmits the stores that were detected to the portable information terminal 10.

In addition, the CPU 21 displays the information about each of the transmitted stores in the contents display part 10 M shown in FIG. 4.

Thereby, the user can obtain information about stores in the forward direction without having to confirm what kind of stores are present in the vicinity of the current position by opening a map.

When the user has found a cafeteria at which he or she can eat lunch, the character data of the "cafeteria/restaurant" in the setting content of the search type 2 setting menu 10 F is displayed on the right side of the audio information switch 10 Q. In this target display panel 10 S corresponding to the audio information switch 10 Q, the character data representing the name of the store, "Tonkyu", is displayed, and furthermore, the registered favorites mark 10 V is displayed superimposed.

In addition, at the lower part of the character data of "Tonkyu" of the target display panel 10 S, the advertisement "Today's lunch (8/1): Cutlet with cheese set ¥600" is displayed.

In order to confirm whether there is a cutlet with cheese set, the user double-clicks the target display panel 10 S that displays the character data "Tonkyu".

Figure 7:
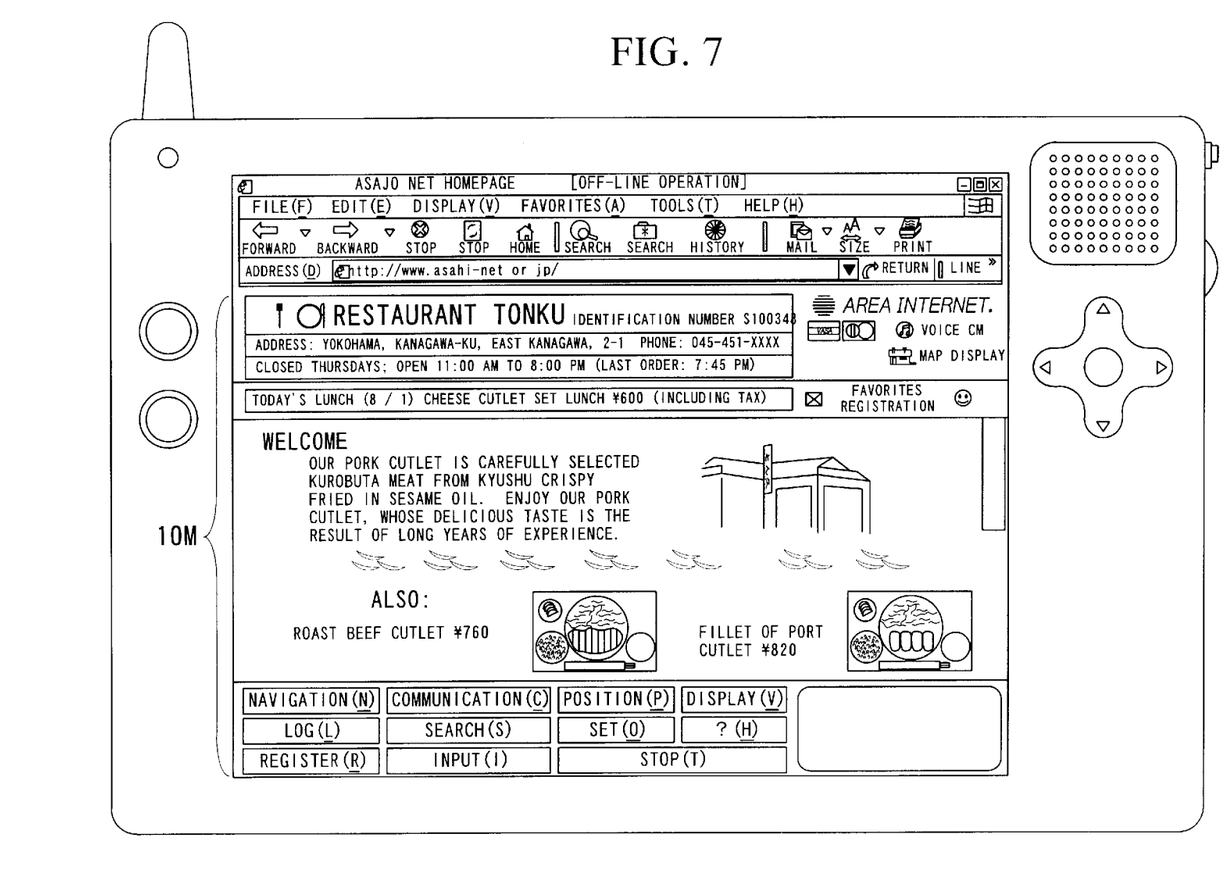
FIG. 7 is a figure showing a screen of a home page of a facility displayed in the portable information terminal 10.

Thereby, the line of the portable information terminal 10 accesses the home page of Tonkyu, and the screen of the home page of Tonkyu, shown in FIG. 7, is displayed in the contents display part 10 M. The user looks at the screen to select the food he or she desires from the menu.

If the user has eaten at the place once and has registered the location in the favorites because he thought the food was tasty, but is uncertain about the location, the user resets the search distance setting menu 10 D to 10 M, and clicks the target switch 10 N corresponding to the target display panel 10 S on which the character data "Tonkyu" is displayed.

Thereby, in the forward direction of the user, the direction of the store Tonkyu is displayed in the search area panel 10 L. That is, the lamp in the direction of the store "Tonkyu" being searched for is lit in red, and the other lamps are lit in pink. The user navigates by the direction of the lighting of the lamps.

Then, when "Tonkyu" is present within 10 M of the user, a chime sound is output from the speaker 10 L.

Thereby, the user knows that Tonkyu is within 10 M, and by clicking the target display panel 10 S that displays the character data of Tonkyu, the map of the vicinity of Tonkyu is displayed in the contents display part 10 M.

In addition, by the user looking at this map, the user can easily arrive at Tonkyu, and can have lunch.

In addition, in the case of the operation mode "Area Internet", the user does not need to pay the cost that applies to the transmission of the line connected to the Internet.

That is, the facilities bear the charge of the communications through the annual membership fee paid by the facilities that have contracted with the Internet provider 5 and through a usage fee paid per number of accesses (for example, 10 yen for 5 accesses) each time the home page is accessed.

At this time, in the case of only opening audio information, the usage fee would be half that of the case of accessing the home page.

In addition, the Internet provider 5 provides to each facility the user information (statistical information and personal information) about the users who connect to the home page of the facility and listen to the audio information in an advertisement.

What is claimed is:

1. A portable information system that is connected to a communication network by a portable information terminal and obtains specified information from an information providing device connected to this communication network, wherein:

a portable information terminal provides a position information acquiring means that acquires information about its own position, and a communication means that establishes a communication line between said portable information terminal and said communication network via an access point and carries out transmission and reception of said position information and specified information, and provides a communication network connection part wherein said information providing device searches for the home pages of facilities including at least stores and public facilities that are in a specified area centered on the user's position based on the position indicated by said position information received from said portable information terminal, and transmits the home page that was found to the portable information terminal;

and wherein said portable information terminal identifies a target portable information terminal and designates a predetermined area, and said information providing system generates a notification to the portable information terminal when the target portable information terminal enters the predetermined area based on position information received by the information providing system from the target portable information terminal.

2. A portable information system according to claim 1 wherein said information providing device searches for URLs of home pages of facilities including stores and public facilities in a table that associates the current position information with the URLs of home pages of facilities including stores and public facilities based on current position information.

3. A portable information system according to claim 1 wherein said portable information terminal displays on the display screen of the portable information terminal the home page of a registered facility in the case that the user carrying said portable information terminal approaches within a certain distance of a facility registered with said information providing device when moving through an urban area where facilities including at least stores and public facilities are present.

4. A portable information system according to claim 2 wherein said information providing device searches for URLs of home pages of facilities including stores and public facilities in a table that associates the current position information with the URLs of home pages of facilities including stores and public facilities based on current position information.

5. A portable information system according to claim 1 wherein said portable information terminal displays on a display screen the home page of another user of a portable information terminal in the case that, when moving outside, the user carrying said portable information system approaches within a certain distance with respect to the other portable information terminal having the same function.

6. An information providing system according to claim 4 wherein said information providing device searches for the URL of home pages of facilities including stores and public facilities in a table that associates the current position information with the URL of the home pages of facilities including the stores and public facilities based on current position information.

7. An information providing system according to claim 5 wherein said portable information terminal displays on the display screen of the portable information terminal the home pages of registered facilities in the case that the user carrying said portable information terminal approaches within a certain distance of a facility registered with said information providing device when moving through an urban area where facilities including at least stores and public facilities are present.

8. An information providing system according to claim 7 wherein said information providing device searches for the URLs of home pages of facilities including stores and public facilities in a table that associates the current position information and the URLs of homepages of facilities including stores and public facilities based on current position information.

9. A portable information system according to claim 1 having a personal database in which at least a registration number, name, sex, age/birthday, nationality, telephone number, address, comments, URL, and the like are associated and stored.

10. A portable information system according to claim 1 wherein said portable information terminal possesses a function that sets the search, direction and search range for facilities including stores and public facilities, and said information providing device carries out a search of facilities including stores and public facilities that are present within the search range and search direction from this portable information terminal based on said position information.

11. A portable information system according to claim 10 wherein said information providing device searches for the URLs of home pages of facilities including stores and public facilities based on position information in a table that associates the current position information with the URLs of home pages of facilities including stores and public facilities.

12. A portable information system according to claim 1 wherein said portable information terminal possesses a function that sets the searches for each type of facility including stores and public facilities, and said information providing system carries out a search of requested facilities including stores and public facilities as a search type from this portable information terminal based on said position information.

13. A portable information system according to claim 12 wherein said information providing device searches for URLs of home pages of facilities including stores and public facilities in a table that associates the current position information with the URLs of home pages of facilities that include stores and public facilities based on current position information.

14. A portable information system according to claim 1, in which the user is connected to the line of a server located at a provider using a portable information terminal and obtains information of home pages of facilities that have advertising contracts with this provider, and wherein:

each facility bears the cost of the communication charges for the portable information terminals connected to the server, and in exchange for bearing the communication charges, the provider supplies statistical information and personal information about the users who access the home page to the facility operating the home page.

15. A portable information system according to claim 1 wherein the notification to the portable information terminal generates an audible alert by the portable information terminal.

16. A portable information system according to claim 15 wherein the entry of each target portable information terminal to the predetermined area generates a distinct audible alert.

17. A portable information system according to claim 1 wherein the predetermined area is centered on the user's position based on the position indicated by said position information received from said portable information terminal.

* * * * *